United States Patent [19]
Sondey

[11] Patent Number: 5,600,059
[45] Date of Patent: Feb. 4, 1997

[54] ENGINE DELIVERY SYSTEM

[76] Inventor: Thomas F. Sondey, 9068 Lone Pine, Shelby Township, Mich. 48317

[21] Appl. No.: 426,240

[22] Filed: Apr. 21, 1995

[51] Int. Cl.⁶ .................................................. G01M 15/00
[52] U.S. Cl. ........................................ 73/116; 198/346.1
[58] Field of Search ........................... 73/116; 198/345.1, 198/345.3, 346.1

[56] References Cited

U.S. PATENT DOCUMENTS

| | | | |
|---|---|---|---|
| 3,675,914 | 7/1972 | Douglass | 73/116 |
| 4,285,233 | 8/1981 | Swis | 73/116 |
| 4,431,103 | 2/1984 | Sekii | 198/345.3 |
| 4,928,806 | 5/1990 | Anderson et al. | 198/345.1 |
| 4,941,347 | 7/1990 | Iijima et al. | 73/116 |
| 5,301,788 | 4/1994 | Hironaka et al. | 198/345.3 |

*Primary Examiner*—Hezron E. Williams
*Assistant Examiner*—Eric S. McCall
*Attorney, Agent, or Firm*—Harness Dickey & Pierce, P.L.C.

[57] ABSTRACT

A user friendly engine delivery system is provided which employs a wheeled engine pallet assembly for transferring a dressed engine to a dynamometer room where the engine will be subsequently tested. A set of guide rails work in conjunction with a self-centering pallet locating system in order to strategically locate the engine pallet relative to the centerline of the dynamometer. Once the engine pallet is properly aligned, a clamping system is used to secure the engine pallet assembly to the bed plate of the dynamometer. A flexible fluid manifold is attached to the pallet assembly and allows a test engineer to uniquely design a fluid manifold to have the proper fluid fittings that are needed for a particular test application. The engine delivery system is versatile in that it can accommodate both front and rear wheel drive engines and further offers the flexibility of dual side entry ways.

20 Claims, 8 Drawing Sheets

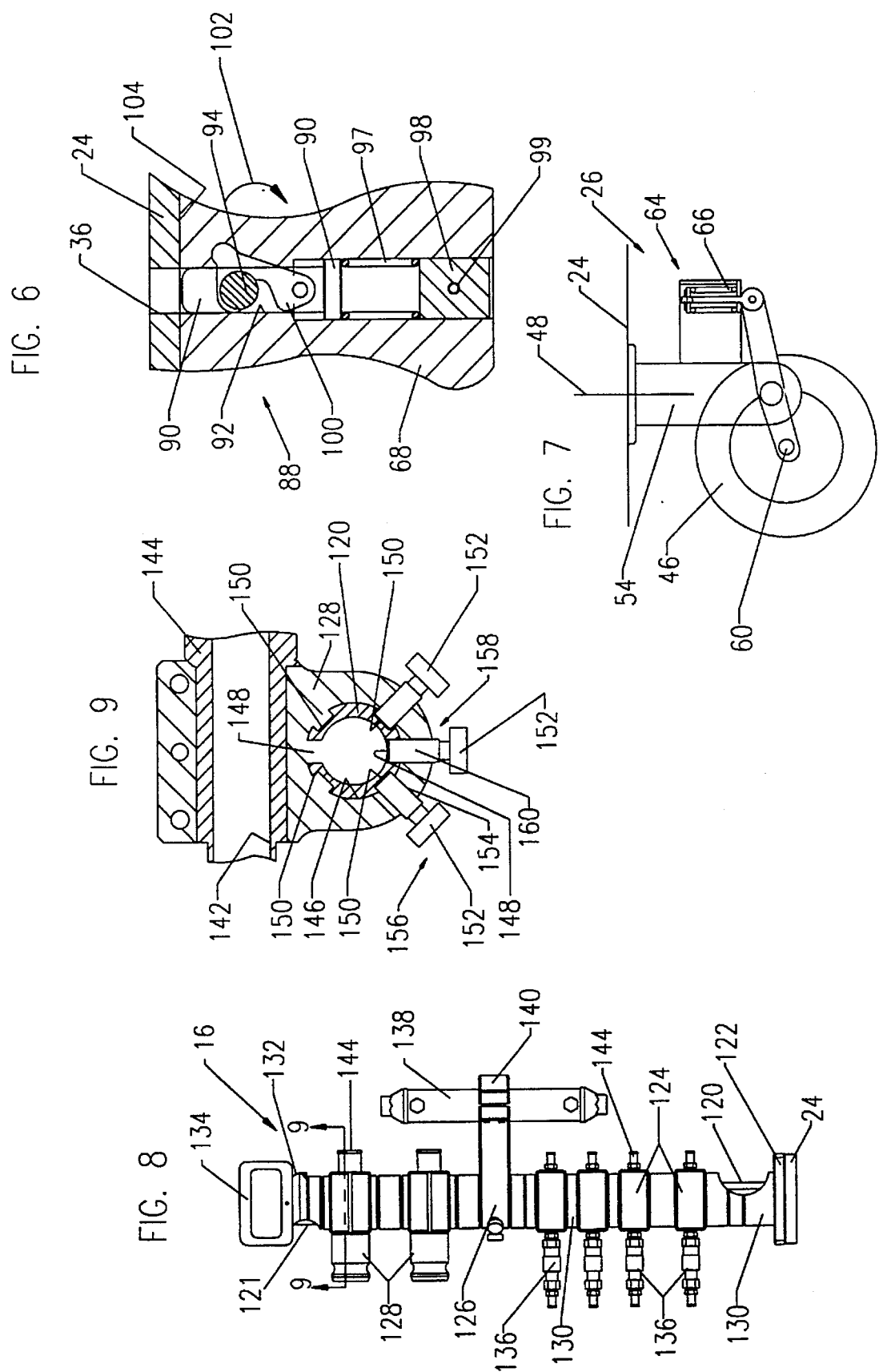

ENGINE DELIVERY SYSTEM

FIELD OF THE INVENTION

This invention relates in general to engine test stands, more specifically to a user friendly versatile engine delivery system that allows a test engineer to dress the engine that is to be tested at a pre-staging area and then to easily maneuver the dressed engine to a dynamometer room where the engine is then strategically positioned and secured relative to the centerline of the dynamometer.

DESCRIPTION OF THE RELATED ART

Test engineers often use engine delivery systems to assist in the preparation (or dressing) of an engine that is going to be tested later on in an engine test cell which is often referred to as an engine dynamometer room. Engine testing is often done on a large scale basis where tests are continuously being run on dozens of different types of engines at any one point in time at a test facility. In order to facilitate the testing process, engineers often use a staging area which allows the engines to be dressed or set up prior to entering the dynamometer room. This minimizes the down time of the dynamometer room.

Dressing the engine usually consists of first fixing an engine to be tested to a box-shaped tubular frame assembly that rests directly on the floor of the staging area. A telespar is generally connected to the frame for mounting the electrical and mechanical umbilicals thereto. The electricals generally include electrical junction boxes, harnesses, etc., while the mechanicals often consist of providing a collection point for the numerous fluid hoses that are used during a test cycle. Transmission adapter extension plates and transmissions may also be connected to the engine at this time for facilitating the testing of the transmission. The problem with the above-mentioned prior art test stand systems become apparent once the engine is dressed because now the dressed engine must be moved to the dynamometer room for testing. This step has been conventionally accomplished by connecting the box frame to an overhead crane which, with the assistance of an operator, transfers the dressed engine to the dynamometer room. However, in order to accomplish this burdensome task, there must be an overhead crane rail extending from the staging area to the dynamometer room. This is very costly. Further, overhead cranes are slow to operate and do not offer the flexibility of easily setting up the dressed engine to the centerline of the dynamometer. Setting up the dressed engine to the centerline of the dynamometer is very important in order to maintain the integrity of the dynamometer as well as to assure proper performance of the dressed engine during testing.

There are further disadvantages of the conventional way of delivering a dressed engine to the dynamometer room. These would include the inherit difficulty of maneuvering the dressed engine in the testing room while in between test runs. If for example the test engineer needs to access the engine between test runs, most likely the electrical and mechanical systems that were connected to the dressed engine would have to be disconnected in order to allow the over-head crane to be able to maneuver in the dynamometer room and to access the dressed engine. This causes additional down time and is labor intensive. Moreover, if the over-head crane is out of order, then maneuvering the engine becomes impossible.

Accordingly, out of the desire to facilitate the testing of engines, and because of the advent of high-tech dynamometer testing facilities, there is the need for an improved engine delivery system that overcomes the above-mentioned problems. It is desirable to have an engine delivery system that easily allows the test engineer to dress the engine in a staging area, and then to easily maneuver the dressed engine to the dynamometer room. It is also desirable to have an engine delivery system that easily and accurately allows the test engineer to set-up the dressed engine to the centerline of the dynamometer. It is preferred that a locking system be employed in order to assure that the dressed engine maintains proper alignment with the centerline of the dynamometer during engine testing. Conversely, it would be advantageous to provide an automotive engine delivery system that allows the test engineer to easily remove the tested engine from the dynamometer and back to the staging area where it may be further processed.

SUMMARY OF THE INVENTION

In light of the foregoing problems there is provided a novel engine delivery system to be used in conjunction with the testing of engines. According to one aspect of the present invention, a wheeled engine pallet assembly is provided for supporting an engine and delivering it to a dynamometer room where the pallet assembly works in conjunction with a pallet locating system. The pallet assembly and the pallet locating system are uniquely designed to ensure that the test engineer can easily and accurately position the centerline of the dressed engine relative to the centerline of the dynamometer. It will be appreciated that the pallet assembly may accommodate both front wheel drive or rear wheel drive automotive engines and that the engine delivery system may accommodate dual side entry or front entry of the engine to the dynamometer. The pallet assembly is provided with a base plate having a detachable handle for maneuvering the pallet assembly. Pivotally connected to the underside of the base plate is a plurality of wheel assemblies each having a dual locking arrangement for controlling the movement of the pallet assembly. A telespar may be mounted to the pallet assembly for organizing the electricals that are required for testing the engine. Suitable engine support stands support the engine and secure it to the base plate.

The pallet locating system includes a pair of elongated frame rails that are secured to the bed plate in the dynamometer room. A set of wheel guides are spaced inward and apart from each frame rail and are fixed to the bed plate and provide a guide for the wheels on the pallet assembly to ride along. A self-centering locating pin assembly is integral with each of said rails and provides a centering means for positioning the pallet assembly, and the engine thereon, relative to the centerline of the dynamometer. Once the centering means has properly located the pallet assembly, a plurality of clamping devices are used to secure the pallet assembly to the frame rails which, in turn, are fixed to the bed plate. This arrangement maintains the engine to be tested in proper location relative to the centerline of the dynamometer as well as allows the test engineer to easily manipulate the pallet assembly when so desired.

A second form of the present invention is provided where a unique flexible manifold assembly may be detachably connected to the base plate of the pallet assembly. The flexible manifold assembly allows a test engineer to design his own fluid manifold in order to satisfy a particular test situation. The flexible manifold includes an elongated central main channel having a plurality of axially extending slots and radially spaced recesses. Fluid modules are arranged on the central channel and may be rotatably positioned at a number of locations on the main channel in order to satisfy the needs of the engineers. Each module has a guide mechanism which includes a set of spring-biased knobs that ride within the elongated slots of the central channel. Each module also has its own spring-biased locking mechanism which mates with one of the recesses within the central channel. Different types of modules may be provided but they all have the same locking mechanism and guide mechanism.

The different types of modules would include fluid handling modules which employ quick-disconnect type connectors, accessory modules for holding a refrigerant recovery tube, heat exchanger, or the like. Spacers may be provided in order to facilitate the arrangement desired by the engineer. A suitable locking cap and handle are provided for securing the modules to the central shaft and for maneuvering the flexible manifold assembly. These and other aspects, objects and advantages of the present invention will be further understood by examining the preferred embodiments of the present invention illustrated in the drawings and by studying the detailed description and the claims found below.

BRIEF DESCRIPTION OF THE DRAWINGS

FIG. 6 is a partial section view taken along line 6—6 of FIG. 4, showing the ejector pin assembly in a loaded position;

FIG. 7 is a partial side view taken along line 7—7 of FIG. 3, showing a partial sectional view of the wheel assembly;

FIG. 8 is a side view of the flexible manifold assembly, showing a number of modules arranged along the central column of the flexible manifold;

FIG. 9 is a partial cross-sectional view taken along line 9—9 of FIG. 8, showing the locking mechanism and guide mechanism of one module of the flexible manifold;

DETAILED DESCRIPTION OF THE PREFERRED EMBODIMENTS

Figure 1:
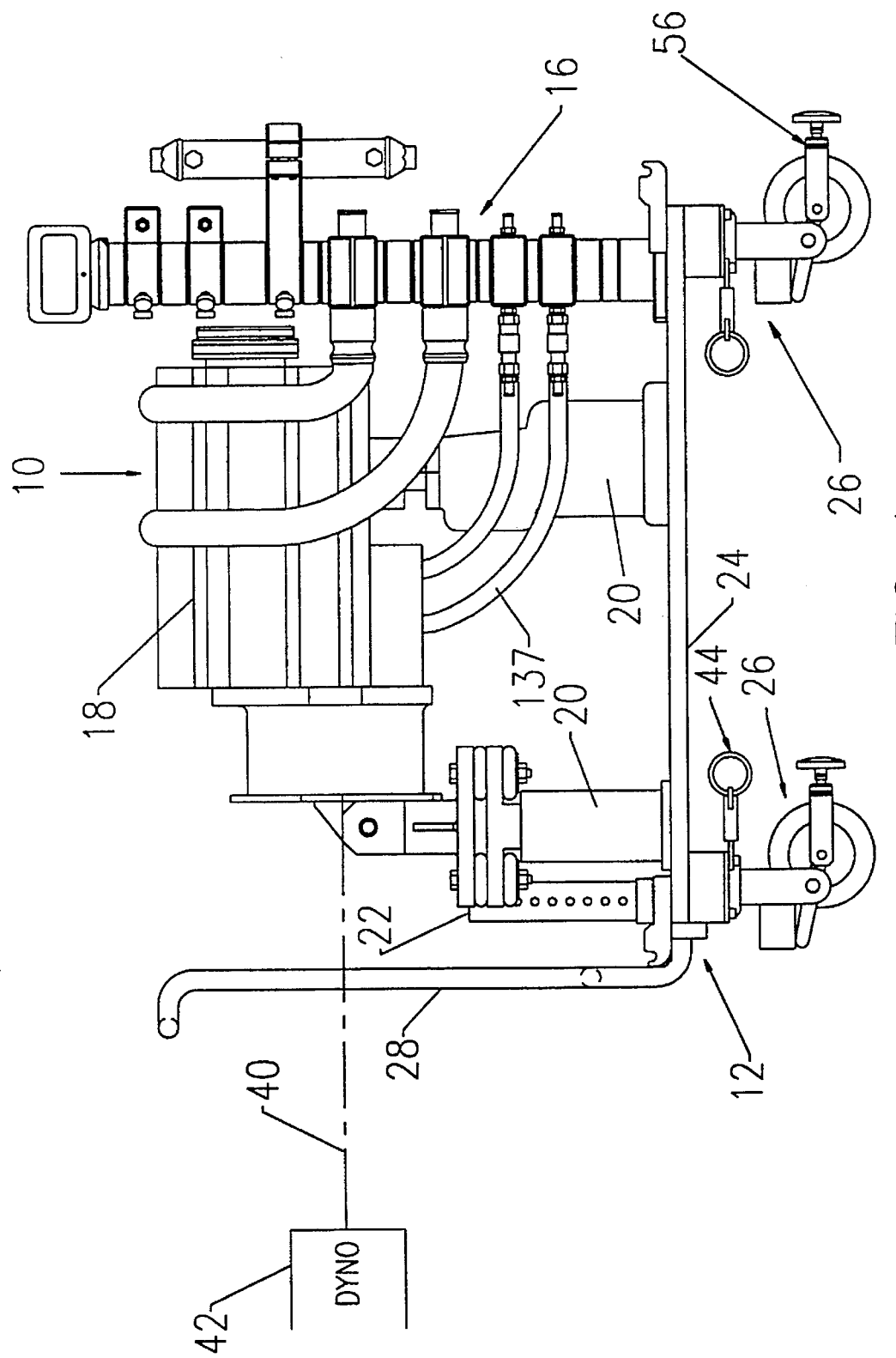
FIG. 1 is a side elevational view of the present invention, showing an engine and the flexible manifold mounted to the wheeled pallet assembly.
Figure 2:
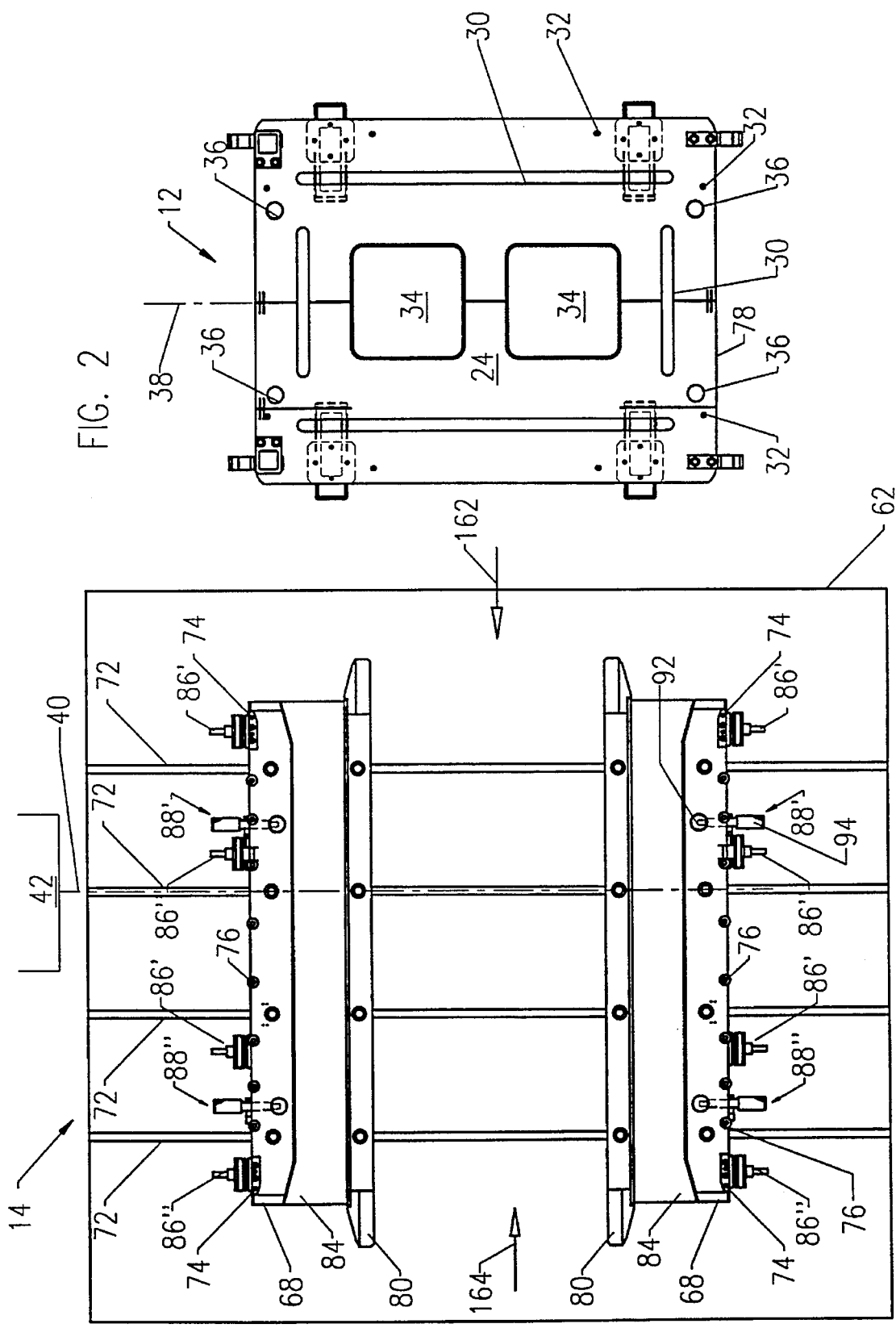
FIG. 2 is a top plan view of a dual entry engine delivery system, illustrating the pallet locating system secured to the bed plate, and the pallet assembly located in a pre-entry position, all relative to the centerline of the dynamometer.
Figure 3:
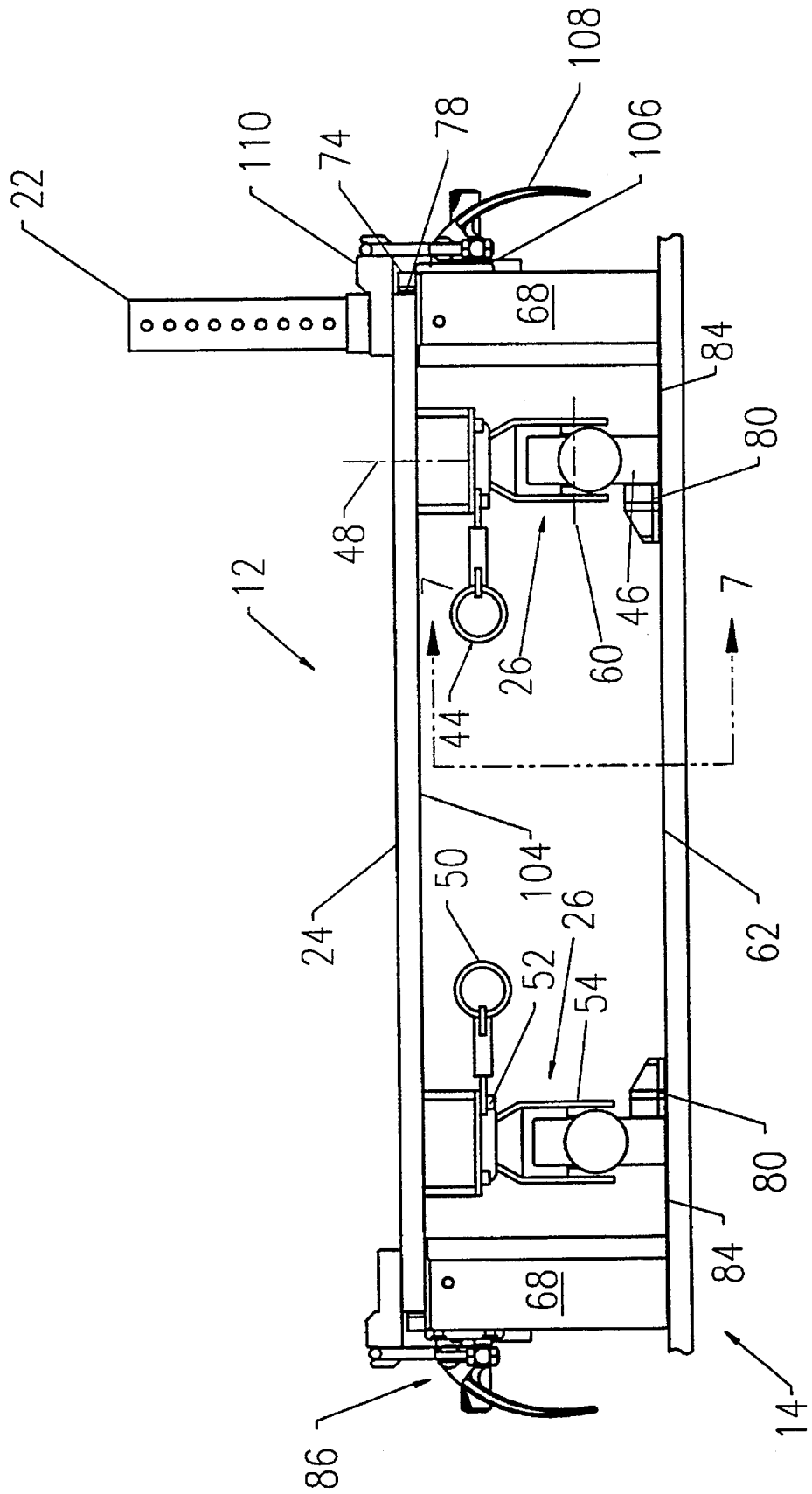
FIG. 3 is a side view taken along line 3—3 of FIG. 4, showing the pallet assembly secured to the frame rails.

An engine delivery system 10, as shown in FIGS. 1 through 3, includes a pallet assembly 12 for supporting an engine, a pallet locating system 14 for accurately positioning the pallet assembly 12 and a flexible manifold 16 that is attached to the pallet assembly 12. A conventional engine 18 is supported by conventional engine support blocks 20 which, in turn, are fastened to the base plate of the pallet assembly 12. A telespar 22 is fixed to the telespar retainer that is located on the base plate of the pallet assembly 12 and acts as a junction box for the electricals and other necessary components.

The primary components of the portable pallet assembly 12 includes a base plate 24, a set of four pivotable lockable wheel assemblies 26, a handle 28 that can be positioned on any of the four sides of the base plate 24, and the previously mentioned telespar 22. It will be appreciated by those skilled in the art that the base plate and, the many other components of the engine delivery system 10, can be made out of steel, aluminum, plastic and/or composite materials. However, steel is preferred and, where necessary, it is preferred to treat the steel with anti-corrosion materials. The base plate 24 has a series of elongated slots 30 that are positioned around the perimeter of the base plate which are operable to receive the flexible manifold 16, the support blocks 20, or an accessory. A series of holes 32 are provided through the base plate 24 which are used for securing the handle 28 to the base plate. It is preferred to provide one or more recesses 34 that are machined in near the center of the base plate 24 in order to provide a collection point for spilled fluids. Gage line 25 is scribed at the centerline of the pallet base plate 24 for assisting in the alignment of the engine delivery system 10 to the centerline 40 of the dynamometer 42. When a front wheel drive engine is mounted to the pallet assembly 12, a second gage line 25' is used for properly aligning the centerline of the crankshaft of the front wheel drive engine to the centerline 40 of the dynamometer 42. The second gage line 25' is offset approximately ten inches from the first gage line 25. The base plate 24 further includes a series of register pin clearance holes 36 which are used to help locate the centerline of the pallet assembly 12 into proper orientation relative to the centerline 40 of the dynamometer 42. Further discussion of this alignment feature will follow.

Figure 5:
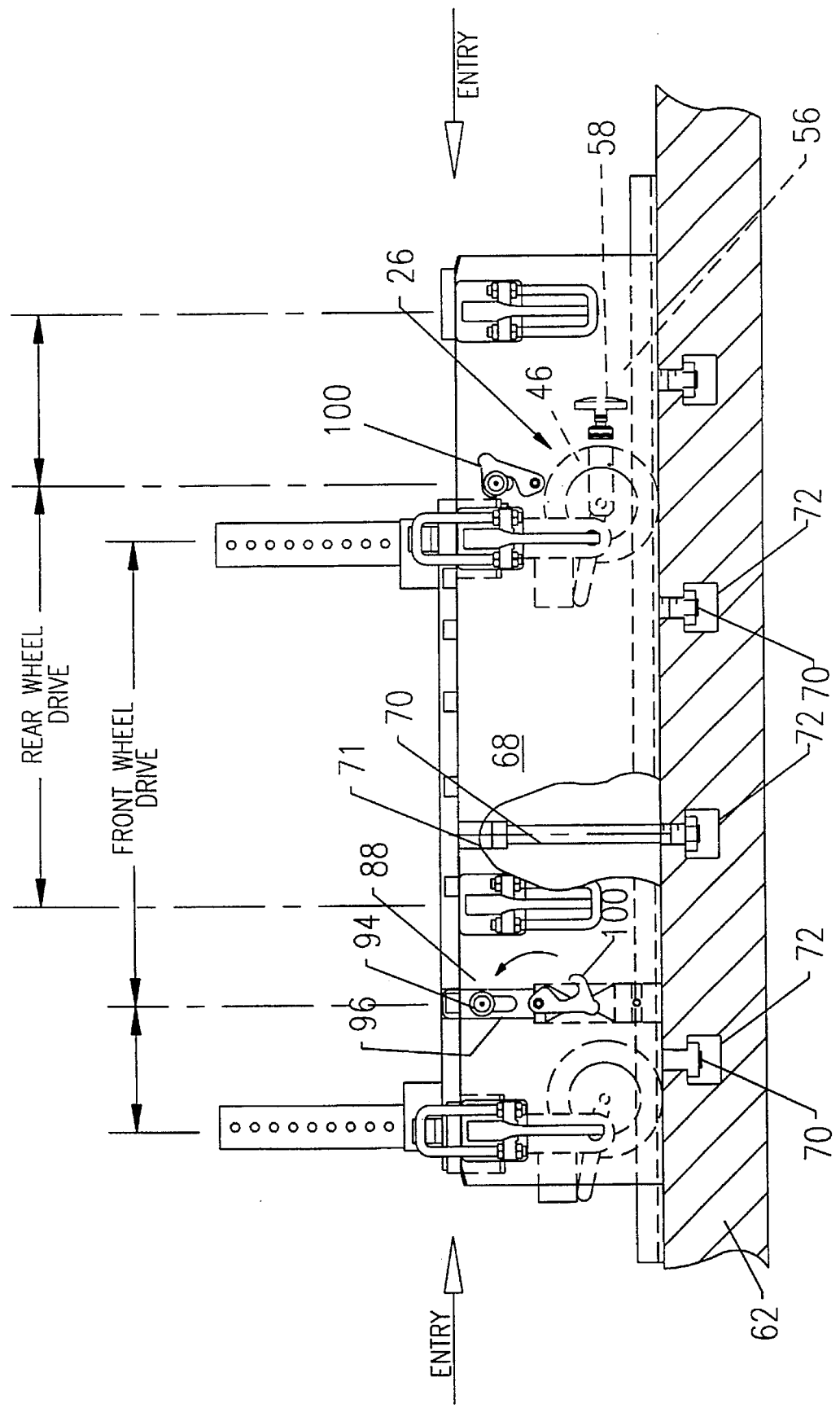
FIG. 5 is a partial end view taken along line 5—5 of FIG. 4, showing the frame rails secured to the bed plate and the pallet assembly in position.

With reference to FIGS. 1,3 and 7, the wheel assembly 26 includes two separate locking mechanisms for controlling the travel of the pallet assembly 12. The first locking mechanism 44 allows the wheel 46 to pivot or swivel about a first axis 48 which extends in a substantially vertical direction. The first locking mechanism 44 includes a spring biased pull pin 50 that, when released, engages one of many radially spaced slots 52 that are located in the lower portion 54 of the wheel assembly 26. By pulling pin 50, the lower portion 54 of the wheel assembly is free to rotate about axis 48. The second locking mechanism 56 (FIG. 5) includes a conventional threaded knob 58 arrangement that causes a friction force against the outer perimeter of the wheel 46. Without this locking mechanism 56, the wheels would freely rotate about horizontal axis 60 which is parallel to the bed plate 62. Thus, the second locking mechanism 56 allows the operator to prevent the pallet assembly 12 from rolling. Further, the wheel assembly 26 also includes a shock and sound absorbing damper 64 that is positioned between the base plate 24 and the wheel 46. The damper 64 preferably acts as a coil spring shock to absorb sound and vibrations that may be generated during the testing of the engine. Further, the damper 64 allows the pallet assembly 12 to be smoothly maneuvered to and from the engine test cell. It will be appreciated that the damper 64 will include either a single, or a plurality of springs 66 for dampening purposes.

Referring now to FIGS. 2 through 5, the pallet locating system 14 is illustrated and includes a pair of elongated frame rails 68 that are secured to the existing bed plate 62 by a plurality of adjustable tension rods 70. The bed plate 62 has channels 72 formed therein for receiving one end of the adjustable rod 70 and the other end of the adjustable rod is slid into a slot 71 located within the frame rail 68. It will be appreciated by those skilled in the art that other arrangements may be provided for detachably securing the frame rail 68 to the bed plate 62.

Figure 4:
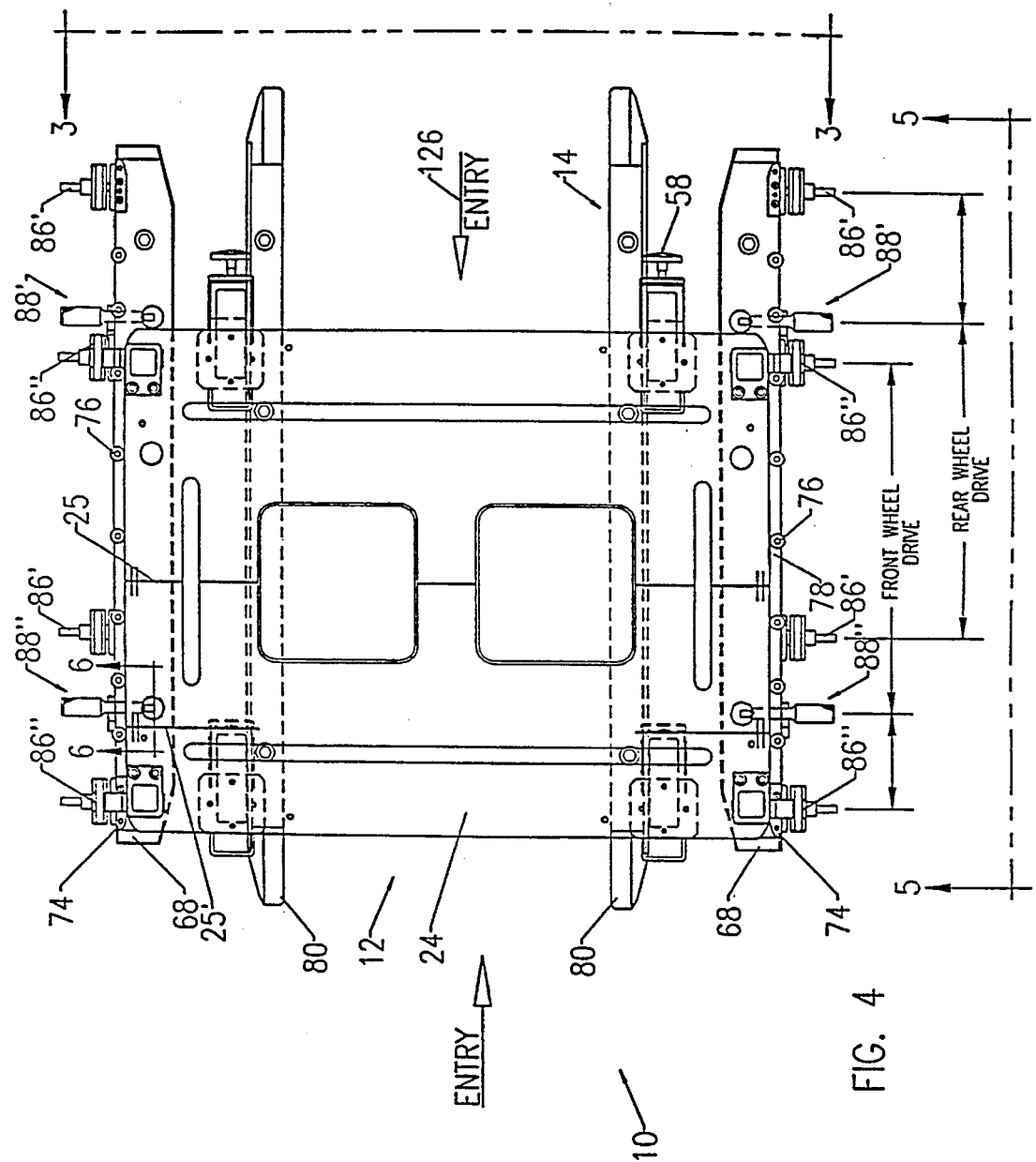
FIG. 4 is a top plan view of the engine delivery system, illustrating a pallet assembly for a front wheel drive or a rear wheel drive engine whereby the pallet is clamped to a set of dual side entry ways, however, the bed plate has been removed for simplicity.

Each frame rail 68 has a diverter 74 that is positioned at the outer ends of the frame rail for protecting a set of cam followers 76 from being damaged by the base plate 24 when it is slid into the engine testing position (See FIG. 4). The cam followers 76 are longitudinally spaced apart and rotatably fixed to the frame rail 68 and provide a guide for the outer edge 78 of the base plate 24 to ride along as the pallet assembly 12 moves into the engine test position. It will be appreciated by those skilled in the art that an alternative guide could be provided which could include a single linear strip of low-friction material.

The pallet locating system 14 also includes a pair of longitudinally extending wheel guides 80 that are fixed to the bed plate 62. The wheel guides 80 assist the operator in positioning the pallet assembly 12 into its testing position. To assist the operator in smoothly delivering the pallet assembly 12 to the testing position, a transitional plate or channel filler 84 is provided (see FIG. 3). The channel filler 84 covers the exposed slots that are created by channel 72 (see FIG. 2). Without the channel cover, the wheels 46 could become lodged or at the least, disrupt the smooth transition of the pallet assembly 12 to the testing position.

The pallet locating system 14 provides a unique way of aligning the centerline 25 of the pallet assembly 12 with the dynamometer's centerline 40. The pallet locating system 14 includes a latching or clamping system 86 and a spring biased locating pin assembly 88. It is preferred that a plurality of clamping systems 86, and at least one register or ejector pin assembly 88, be used with each pallet assembly 12. The pin assembly 88 (See FIGS. 2, 5 and 6) generally consists of a register pin 90 that is preferably made of steel and should be located within a bore 92 of the frame rail 68. A register pin handle 94 is transversely affixed to the register pin 90 and extends through a side slot 96 that is also located in the frame rail 68. A spring 97 is disposed between a fixed spring cap 98 and the underneath side of the register pin 90 for biasing the pin assembly 88 in an upward direction. The spring cap 98 is held in place by a pin 99 that accents through the frame rail 68. A pivotable weighted register pin retainer 100 is mounted to rail 68 and retains the register pin handle 94 when in the loaded position (as shown). The pin assembly 88 is placed into the loaded position by the operator before the pallet assembly 12 approaches the frame rails 68. To unload the pin assembly 88, the operator merely depresses the pin handle 94 which causes the weighted pin retainer 100 to free up and hinge in the direction of the arrow 102. This allows the register pin 90 to then naturally bias upwardly where it rests on the underneath side 104 of base plate 24 until the register pin clearance hole 36 is reached. At that time, the upwardly biased register pin 90 naturally gravitates to clearance hole 36 which, in turn, positions the pallet's centerline 38 with the dynamometer's centerline 40.

The pallet locating system 14 further includes a clamping assembly 86 for firmly securing the pallet assembly 12 to the rails 68. The clamping assembly 86 is a purchased component and there is preferably 4 clamps, one at each corner, for securing the pallet assembly 12 to the set of rails 68. The clamping assembly 86 is implemented once the register pins 90 have ejected and are locked into place with respect to bore 36 of the pallet assembly 12. Referring to FIGS. 2 and 3, each clamping assembly 86 includes a lower bracket 106 that is secured to the side of the frame rail 68 and is pivotally connected to a standard hinged clamp 108, and an upper receiving bracket 110 that is fastened to the top of the base plate 24. When the clamping assembly 86 is locked into position (FIG. 3), nearly 30,000 pounds of clamping capacity is generated which easily secures the pallet assembly 12 relative to the bed plate 62.

Referring now to FIGS. 8 and 9, a unique flexible fluid manifold 16 is illustrated. The flexible manifold 16 primarily includes a central elongated channel 120 that is affixed by conventional means to a base plate 122, a plurality of modules 124, 126 and 128, a plurality of spacers 130, a fastening mechanism 132 and a detachable handle 134. The flexible manifold 16 is unique in that it allows a test engineer to rapidly, and easily design a fluid manifold for a particular test situation. For example, the manifold 16 illustrated can be disassembled within a matter of a few minutes so that the modules 124, 126 and 128 can be selectively arranged according to whatever pattern is desired. The use of the manifold 16 is also enhanced through use of quick-disconnect type connectors 136 which are an integral part of each module 124. This feature allows the test engineer to quickly attach and detach fluid conduits 137 to and from the flexible manifold 16. Also, a special accessory module 126 is provided which is capable of supporting an accessory 138, for example, a fluid or vapor holding tank. A simple clamping member 140 is an integral part of module 126 and allows for easy removal of the accessory 138. Also, an additional type of module 128 can be provided which allows for connection of conventional type fluid couplers, for example, hose clamps.

The upper end of the central channel 120 has a threaded portion 121 for receiving the fastening mechanism 132 which, when assembled, assists in sandwiching all of the modules and spacers against the base plate 122. A threaded handle 134 may then be secured, via a standard threaded assembly, to the upper portion of the central channel 124 for assisting the operator when maneuvering the manifold 16. As previously discussed, the base plate 122 of the manifold 16 is secured, via conventional fastening devices, to the base plate 24 of the pallet assembly when it is desired to use the manifold 16.

With specific reference to FIG. 9, each module is preferably made of metal and has an internal fluid passageway 142 and an integral external connector portion 144 for connecting to a standard type quick disconnector 136. Each module also has a central bore 146 for receiving the central channel 120. The central channel 120 has machined therein a pair of axially extending slots or grooves 148 that extend from the base 122 to the threaded fastening mechanism 132. The elongated channel 120 also has a series of recesses or detentes 150 located at various radial locations along the linear length of the channel 120. A standard spring biased lever 152 is connected preferably by a threaded connection to each module and has a shaft 160 that extends through a bore 154 that passes through the module. Thus, each module has its own guide mechanism 156 and locking mechanism 158 which together allow a test engineer to slide the module 124 along the channel 120 to a desired position and then secure the module into place. If the operator would like to remove the module from the channel 120, then lever 152 would need to be pulled in an outward direction thus disengaging shaft 160 from the corresponding detente 150. However, if the test engineer would like to merely relocate the module to a different radial position, then all three levers 152 would need to be pulled in an outward direction thus allowing the operator to freely reposition the module to a new location on the channel 120. Once the desired position is obtained, levers 152 can be released which, in turn, causes the module to be re-secured to the channel 120. It will be appreciated by those skilled in the art that modules 124, 126 and 128 have similar designs which employ the same type of guide mechanism 156 and locking mechanism 158. Therefore, additional discussion of such is not necessary.

Figure 10:
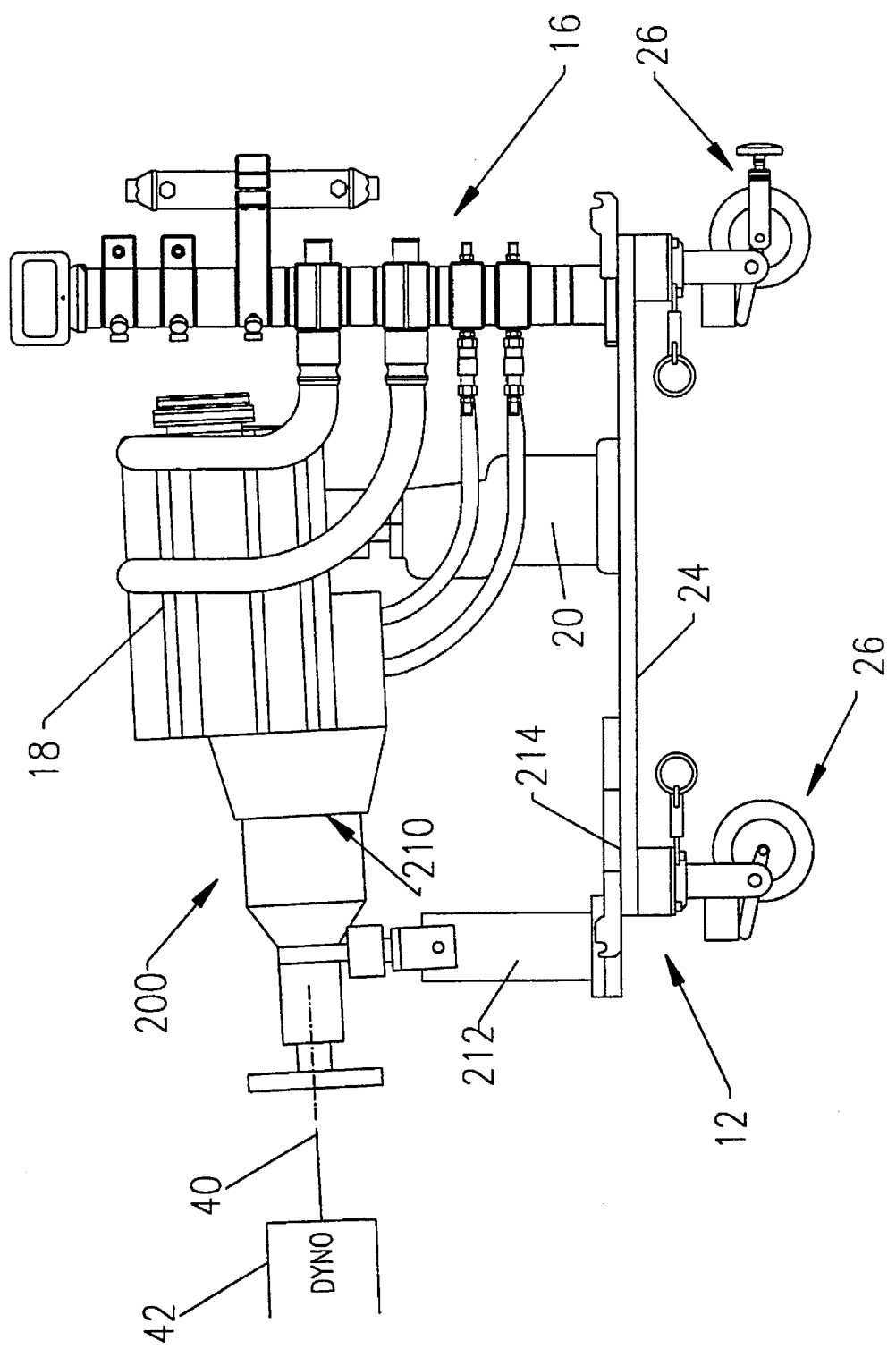
FIG. 10 is a side elevational view of an alternative embodiment of the present invention, showing an engine and transmission as well as the flexible manifold assembly mounted to the pallet assembly.
Figure 11:
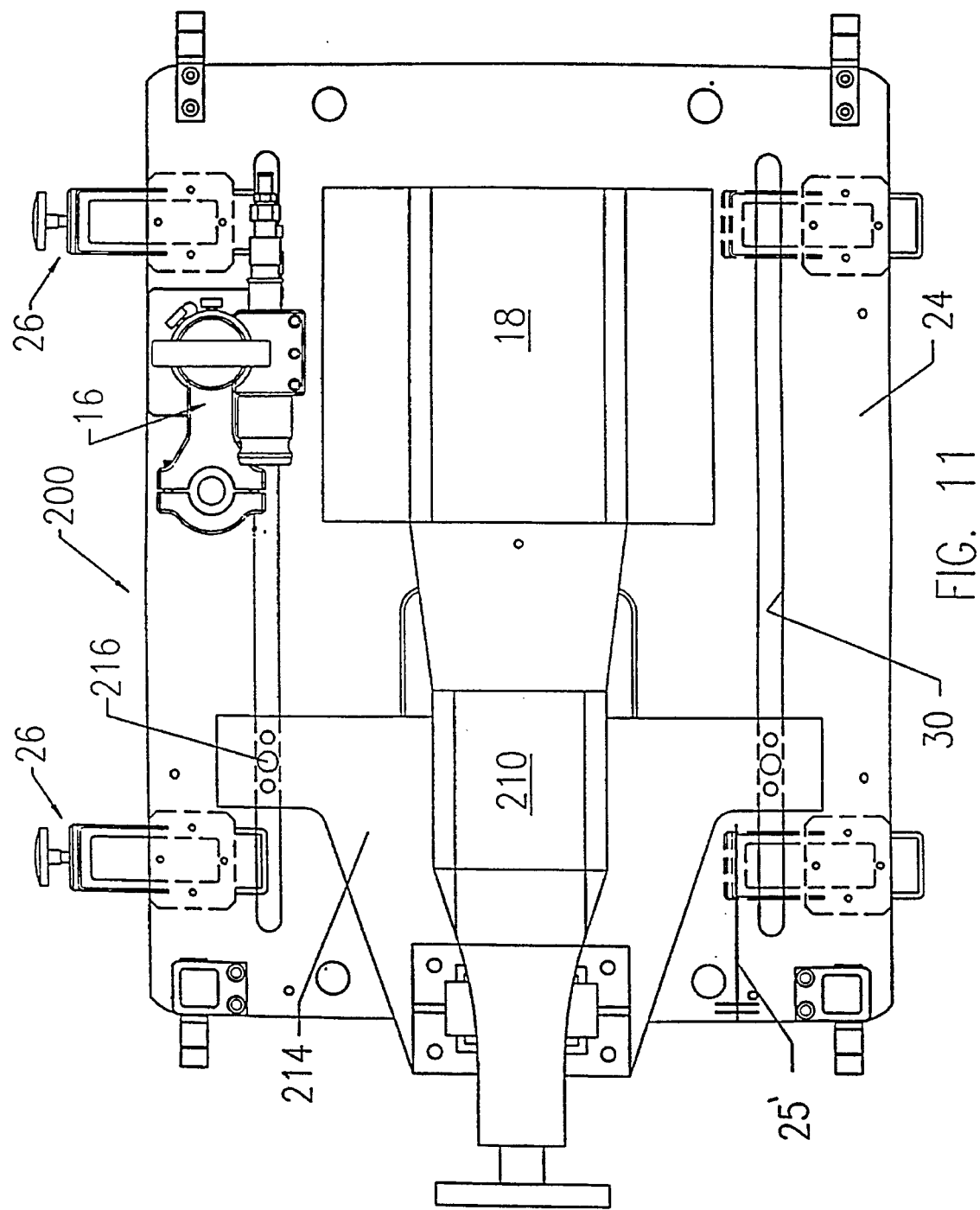
FIG. 11 is a top plan view of the FIG. 8 alternative embodiment, illustrating the transmission and engine in their centerline position relative to the pallet assembly and flexible manifold assembly.

Referring now to FIG. 10, an alternative engine pallet assembly 200 is illustrated which accommodates the testing of an engine and a transmission 210. Where possible, like numbers are used to identify similar components. In this pallet assembly 200, the transmission 21 0 is supported by transmission support blocks 21 2 which are fixed to a transmission adapter extension plate 21 4. The adapter plate 21 4 is in turn, fixed to the base plate 24 by fasteners 216 that extend through the slots 30 that are located in the base plate 24. This alternative pallet assembly 200 is flexible in that it allows different size transmissions to be accommodated by merely sliding the adapter plate 214 in a longitudinal direction relative to the slots 30. Further, it is contemplated that the pallet assemblies 12 and 200 are capable of handling four cylinder engines, six cylinder engines, ten cylinder engines and twelve cylinder engines. This may be accommodated by using base plates 24 that have different lengths and widths. However, the standard base plate (as shown) is 44 inches in length which will easily accommodate an eight cylinder engine. Further, the pallet assemblies 12 and 200 are sufficiently rigid to withstand 20,000 pounds in weight of engine, transmission, manifold and other components. Pallet assemblies 12 and 200 both utilize the same pallet locating system 14.

The operation of the engine delivery system 10 will now be presented. Since pallet assemblies 12 and 200 operate in the same manner, only assembly 12 will be discussed. Referring to FIG. 1, an engine pallet assembly 10 is positioned in a staging area where an engine 18 is secured to the base plate by support blocks. It is important to locate the centerline of the crankshaft of the engine at a position relative to the centerline 40 of the dynamometer 42. Next the test engineer can proceed to dress the engine by connecting the appropriate electrical and fluid systems that are required in order to test the engine. To assist in this regard, the flexible manifold 16 may be employed to allow the test engineer to uniquely design a fluid manifold 16. By using the flexible manifold 16, the fluid conduits of the dynamometer 42 can be easily connected to the engine 18. Once the engine is dressed, the pallet assembly 10 can be wheeled to the engine dynamometer room to a position as indicated by FIG. 2. It will be appreciated that the engine delivery system 10 is flexible in that the pallet assembly 12 can enter in the direction of arrow 162 or 164. It will also be appreciated that a front entry system could be employed which would require the rails 68 and the wheel guides 80 to be re-oriented by 90 degrees on the bed plate 62.

Now that the pallet assembly 12 is positioned relative to the rails 68, the pin assembly 88 should now be loaded (see FIG. 6) by the methods previously discussed. Now the test engineer can wheel the pallet assembly 12 towards the engine testing position. However, once the pallet is between approximately one third to one half of the way into position, the pin assembly 88 should be unloaded (see FIG. 5) thus allowing the register pin retainer 100 to release the ejector pin 90 so that it rides along the underside 104 of the base plate 24. The operator may now proceed to push the pallet assembly towards a position where the centerlines of the pallet and dynamometer are coaxial. There will be no doubt as to when this important alignment occurs because the ejector pin 90 will automatically ram up into the clearance holes 36 of the base plate 24. Once this event occurs, the handles 110 of clamps 86' can be cantilevered to the position shown in FIG. 3. The engine is now located into its engine testing position whereby the centerline of the engine crankshaft now is aligned with the centerline 40 of the dynamometer The test engineer may remove the pallet assembly 12 by releasing the clamps 86' and re-loading the pin assemblies 88. This frees up the pallet assembly 12 from the rail 68 so that the pallet assembly 12 can be freely moved around.

An alternative form of the present invention includes providing for testing of front wheel drive and rear wheel drive engines (see FIG. 4). In order to accommodate this testing need, the same pallet assembly 12 (or 200) is used and the engine 18 is secured to the pallet assembly 12 in the same manner. However, the difference lies in the positioning of the pallet assembly 12 relative to the centerline 40 of the dynamometer. For a rear wheel drive engine, the pallet assembly 12 is aligned such that clamps 86' are used to secure the pallet assembly 12 to the frame rails 68. Likewise, register pin assemblies 88' are used to help locate the pallet assembly 12 to its proper position prior to securing the pallet assembly 12 to the rails 68. At which time the gage line 25 will line up with the centerline of the dynamometer. However, if a front wheel drive engine is to be tested, then the front wheel drive engine 18 is secured to the pallet assembly 12 such that the engine 18 is centered thereon. However, in order to accommodate for the fact that the centerline of the crankshaft of a front wheel drive engine is approximately ten inches offset from the centerline of a rear wheel drive engine, the pallet assembly 12 is merely offset by a set distance so that the centerline of the front wheel drive engine can be aligned with the centerline of the dynamometer. The second gage line 25' assists the test engineer in properly aligning the centerline of the crankshaft of the front wheel drive engine with the centerline 40 of the dynamometer. Accordingly, self-centering ejector pen assemblies 88" are used in conjunction with a set of four clamping assemblies 86" when front wheel drive engines are being tested. Hence, the engine delivery system 10 is versatile in that it will accommodate front and rear wheel drive engines as well as dual side entryway and front entryway capabilities.

Yet another alternative form of the present invention includes modifying the length of the frame rail 68 and guide rails 80 in order to accommodate pallet assemblies 12 that could be modified for various testing parameters. Such modifications would include the various components that were described above.

It should be appreciated by those skilled in the art that other variations to the preferred embodiments to the present invention, beyond those mentioned above, are possible. Accordingly, it is to be understood that the protection sought and to be afforded hereby should be deemed to extend to the subject matter defined by the claims below, including all fair equivalence thereof.

What is claimed is:

1. An engine delivery system for delivering an internal combustion engine to an engine test room that has a dynamometer and a bed plate, the engine delivery system comprising:

a portable engine pallet assembly for supporting an engine, said assembly including a base plate, a detachable handle connected to the base plate for steering the assembly, a plurality of pivotable wheel assemblies connected to the base plate that are capable of being locked, and an accessory mounting device connected to the base plate that is operable to support electrical components; and a pallet locating system for locating said engine pallet assembly relative to a centerline of the dynamometer, said locating system including a pair of elongated rails that are secured to the bed plate, a pair of wheel guides secured to the bed plate for guiding the wheels of the pallet assembly, a self-centering locating pin assembly located relative to said rails, and a plurality of clamping devices connected to one of said rails for securing the engine pallet assembly to said rails.

2. The engine delivery system according to claim 1, further comprising a flexible manifold that is secured to said engine pallet assembly, the manifold including a central column having axially extending recesses therein.

3. The engine delivery system according to claim 2, wherein said manifold further includes a plurality of modules that are adjustably positioned on said column.

4. The engine delivery system according to claim 2, wherein said manifold includes quick disconnect means and a handle for maneuvering said manifold.

5. The engine delivery system according to claim 1, wherein each of said clamping devices include a first portion that is affixed to said base plate and a second portion that is pivotally connected to said rails for locking said pallet assembly in place during testing of said engine.

6. The engine delivery system according to claim 1, wherein said self-centering locating pin assembly includes:

a register pin positioned within a bore of said rails;

a register pin handle connected to said register pin;

a spring positioned within the bore for biasing the register pin to an engagement position; and a pivotable register pin retainer for maintaining the register pin in a retracted position.

7. The engine delivery system according to claim 1, wherein each of said wheel assemblies include a wheel and a dual locking mechanism for preventing the wheel from swiveling about a first axis and for preventing the wheel from rotating about a second axis.

8. The engine delivery system according to claim 1, wherein each of said wheel assemblies include a spring loaded suspension system for dampening noise and vibrations that are generated during the operation of the dynamometer.

9. The engine delivery system according to claim 1, wherein each of said rails include a plurality of cams for guiding the base plate along a path until the pallet assembly is locked into place.

10. The engine delivery system according to claim 9, wherein each of said rails include a diverter for orienting the base plate relative to said rails, said diverter being operable to protect the cams.

11. The engine delivery system according to claim 1, further comprising an adjustable securing means for releasably securing each of said rails to said bed plate.

12. The engine delivery system according to claim 1, further comprising a plate disposed between said rail and said wheel guide and on top of said bed plate for assisting in smooth operation of said pallet assembly.

13. An engine pallet for supporting an engine during engine testing, the pallet comprising:

a base plate;

a set of wheel assemblies pivotally connected to the base plate;

a detachable handle connected to the base plate for assisting in the maneuvering of the engine pallet;

a clamping system for securing the engine pallet in place during the testing of the engine; and a pallet locating system for coaxially aligning a centerline of the engine with a centerline of a dynamometer, said locating system including a spring biased locating pin that is operable to engage a receptacle in the base plate.

14. The engine pallet according to claim 13, further comprising a fluid handling apparatus secured to the base plate for distributing fluids.

15. The engine pallet according to claim 14, wherein said fluid handling apparatus includes a floor plate for supporting a central column, a plurality of fluid modules slideably connected to said column, a fastener for retaining each of said fluid modules on the central column, and a handle secured to the central column for maneuvering the manifold.

16. The engine pallet according to claim 13, further comprising a fluid manifold assembly comprised of: a main channel having a plurality of axially extending slots and radially spaced recesses; a fluid device movably positioned on said main channel; a spring biased locking member extending through said fluid device and into said recesses; and a guide extending through said fluid device and into said slots.

17. The engine pallet as claimed in claim 13, further comprising a dampening device connected to each wheel assembly for sound and vibration attenuation.

18. A method of delivering an engine to a dynamometer where the engine is to be tested, the engine having a centerline along its crankshaft that is common to a centerline of the dynamometer, the method comprising:

providing a staging area, an engine that is to be tested, a wheeled engine delivery pallet, and an engine dynamometer;

securing the engine to be tested to the delivery pallet;

dressing the engine while it is in the staging area;

rolling the delivery pallet that has the engine secured thereon to a room where the engine dynamometer is located;

moving the pallet towards the centerline of the dynamometer;

pre-loading a locating pin that is spring biased;

releasing the locating pin when the delivery pallet has reached a certain location; and automatically positioning the locating pin within a locator hole that is in the engine delivery pallet when the centerline of the engine is aligned with the centerline of the dynamometer.

19. The method according to claim 18, further comprising the step of engaging a clamping member in order to fix the position of said centerlines relative to one another during the testing of said engine.

20. The method according to claim 18, further comprising the steps of securing guide rails to a bed plate in order to provide a guide for the wheeled engine delivery pallet to ride along until the self-centering locator locks into position.

* * * * *

UNITED STATES PATENT AND TRADEMARK OFFICE
CERTIFICATE OF CORRECTION

PATENT NO. : 5,600,059
DATED : February 4, 1997
INVENTOR(S) : Thomas F. Sondey

It is certified that error appears in the above-indentified patent and that said Letters Patent is hereby corrected as shown below:

On the Title page, and col. 1, line 1, before "Engine" insert --Modular--.
Column 7, line 14, after "transmission" change "21 0" to --210--.
Column 7, line 15, after "blocks" change "21 2" to --212--.
Column 7, line 16, after "plate" change "21 4" to --214--.
Column 7, line 17, before "is" change "21 4" to --214--.

Signed and Sealed this

Twenty-ninth Day of July, 1997

Attest:

BRUCE LEHMAN

Attesting Officer

Commissioner of Patents and Trademarks